(12) United States Patent
Hong

(10) Patent No.: US 12,495,302 B2
(45) Date of Patent: Dec. 9, 2025

(54) COMMUNICATION METHOD, USER EQUIPMENT, AND BASE STATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 164 days.

(21) Appl. No.: 18/291,197

(22) PCT Filed: Jul. 28, 2021

(86) PCT No.: PCT/CN2021/109086
§ 371 (c)(1),
(2) Date: Jan. 22, 2024

(87) PCT Pub. No.: WO2023/004655
PCT Pub. Date: Feb. 2, 2023

(65) Prior Publication Data
US 2025/0106635 A1    Mar. 27, 2025

(51) Int. Cl.
*H04W 12/37* (2021.01)
*H04W 88/04* (2009.01)
*H04W 92/18* (2009.01)

(52) U.S. Cl.
CPC ............ *H04W 12/37* (2021.01); *H04W 88/04* (2013.01); *H04W 92/18* (2013.01)

(58) Field of Classification Search
CPC ...... H04W 12/37; H04W 88/04; H04W 92/18
See application file for complete search history.

(56) References Cited

U.S. PATENT DOCUMENTS 10,660,008 B2 * 5/2020 Ma .................. H04W 12/02
11,297,502 B2 * 4/2022 Muhanna ............... H04L 63/20

FOREIGN PATENT DOCUMENTS

| CN | 111641582 A | 9/2020 |
|----|-------------|--------|
| CN | 112166623 A | 1/2021 |
| CN | 113068180 A | 7/2021 |
| WO | WO 2021027435 A1 | 2/2021 |

OTHER PUBLICATIONS

PCT/CN2021/109086 International Search Report dated Apr. 19, 2022, 3 pages.
European Patent Application No. 21951267.0, Search Report and Opinion dated Jul. 19, 2024, 10 pages.
3rd Generation Partnership Project; Technical Specification Group Services and System Aspects; Study on security aspects of enhancement for proximity based services in the 5G System (5GS)(Release 17) Mar. 12, 2021, 120 pages.

* cited by examiner

*Primary Examiner* — Pramila Parthasarathy
(74) *Attorney, Agent, or Firm* — Cozen O'Connor

(57) ABSTRACT

A communication method performed by a relay user equipment (UE) includes: determining an activation status of a user plane (UP) security policy of a first link between the relay UE and a base station, and, on the basis of the activation status of the UP security policy of the first link, activating UP security of a second link between the relay UE and a remote UE. Related communication methods by a remote user equipment and a base station are also disclosed.

16 Claims, 11 Drawing Sheets

COMMUNICATION METHOD, USER EQUIPMENT, AND BASE STATION

CROSS-REFERENCE TO RELATED APPLICATION

This application is the U.S. National Stage Application of International Application No. PCT/CN2021/109086, filed on Jul. 28, 2021, the entire disclosure of which is incorporated herein by reference.

TECHNICAL FIELD

The present disclosure relates to a field of wireless communication technologies, and specifically to a communication method and a communication apparatus, a user equipment, a base station, a core network device and a storage medium.

BACKGROUND

In a wireless communication system, indirect communication between a remote user equipment (UE) and a base station is achieved via a 3-layer UE-to-network (U2N) relay (i.e., L3 U2N relay) which is based on 5G Proximity based Service (ProSe). As indirect network communication between the Remote UE and the base station is performed via the L3 U2N relay, it includes two links, i.e., a Uu link between a relay UE and the base station and a PC5 link between the remote UE and the relay UE. In order to ensure the end-to-end (E2E) security of communication between the remote UE and the base station, it is usually necessary to ensure that both the Uu link and the PC5 link are protected, and to ensure that the security policy of the Uu link is consistently enforced with the security policy of the PC5 link.

SUMMARY

According to a first aspect of the present disclosure, a communication method is provided, which is performed by a relay user equipment (UE). The method includes: determining an activation status of a user plane (UP) security policy of a first link between the relay UE and a base station; and activating UP security of a second link between the relay UE and a remote UE based on the activation status of the UP security policy of the first link.

According to a second aspect of the present disclosure, a communication method is provided, which is performed by a remote UE. The method includes: obtaining a second UP security activation indication sent by a relay UE, in which the second UP security activation indication indicates whether to activate UP security of the remote UE; and in response to the second UP security activation indication indicating to activate the UP security, activating the UP security of the remote UE based on the second UP security activation indication.

According to a third aspect of the present disclosure, a communication method is provided, which is performed by a base station. The method includes: obtaining a PDU session establishment request sent by a relay UE and sending the PDU session establishment request to a core network device; setting a UP security policy; receiving a PDU session request message sent by the core network device, in which the PDU session request message includes a UP security policy; and activating UP security of a first link between the relay UE and the base station based on the UP security policy sent by the core network device.

Additional aspects and advantages of the disclosure will be set forth in part in the description which follows, and in part may be obvious from the description, or may be learned by practice of the disclosure.

BRIEF DESCRIPTION OF THE DRAWINGS

The above and/or additional aspects and advantages of the present disclosure may become apparent and readily understood from the following description of the embodiments in conjunction with the accompanying drawings.

DETAILED DESCRIPTION

Figure 1:
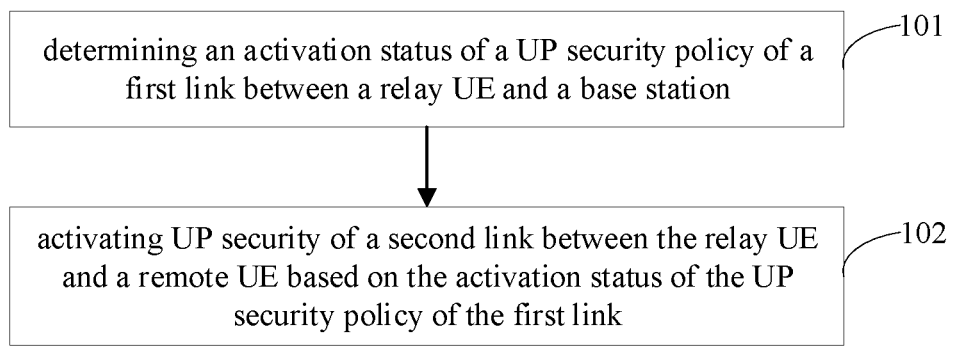
FIG. 1 is a schematic flowchart of a communication method as applied to a relay user equipment (UE) according to an embodiment of the present disclosure.

The embodiments will be described herein, examples of which are shown in the accompanying drawings. When the following descriptions refer to the accompanying drawings, same numbers in different drawings represent same or similar elements unless otherwise indicated. The implementations described in the following embodiments do not represent all implementations consistent with the embodiments of the present disclosure. Rather, they are merely examples of apparatuses and methods consistent with some aspects of the disclosure as detailed in the appended claims.

The terms described in the present disclosure are only for the purpose of describing specific embodiments and are not intended to limit the present disclosure. The singular forms "a/an", "the" and "said" used in the disclosure and appended claims are also intended to include plural forms, unless the context clearly indicates otherwise. It should also be understood that the term "and/or" used in the disclosure means and includes any or all possible combinations of including one or more associated listed items.

It should be understood that, although the terms first, second, third, etc. may be used in the disclosure to describe various information, such information shall not be limited to these terms. These terms are only used to distinguish the same category of information. For example, without departing from the scope of the present disclosure, first information may also be referred to as second information, and similarly, second information may also be referred to as first information. Depending on the context, the word "if" as used herein may be interpreted as "when" or "in response to determining".

The embodiments described below with reference to the accompanying drawings are exemplary and intended to explain the present disclosure, which are not to be construed as limitations of the present disclosure.

In the related art, Uu link protection between the relay UE and the base station is relatively independent from PC5 link protection between the remote UE and the relay UE. This cannot ensure that communication protection between the remote UE and the network meets the security requirements of the requested relay service. In order to solve the technical problem that communication protection provided by the existing communication methods cannot meet the security requirements of the relay service, a communication method and a communication apparatus, a user equipment, a base station, a core network device and a storage medium are proposed in the disclosure.

According to the communication method and the communication apparatus, the user equipment, the base station, the core network device and the storage medium, the relay UE may determine the activation status of the UP security policy of the first link between the relay UE itself and the base station, and activates the UP security of the second link between the relay UE and the remote UE based on the activation status of the UP security policy of the first link. In other words, the methods in the embodiments of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

The communication method and the communication apparatus, the user equipment (UE), the base station, the core network device and the storage medium will be described in detail below with reference to the accompanying drawings.

FIG. 1 is a schematic flowchart of a communication method according to an embodiment of the present disclosure, which is applied to a relay UE. As shown in FIG. 1, the communication method may include the following steps at 101-102.

At 101, it is determined an activation status of a user plane (UP) security policy of a first link between the relay UE and a base station.

It should be noted that the method in the embodiment of the present disclosure may be applied to any UE. The UE may refer to a device that provides voice and/or data connectivity to users. The UE may communicate with one or more core networks via a radio access network (RAN). The UE may be an Internet of things (IoT) terminal, such as a sensor device, a mobile phone (or a "cellular" phone) and a computer with the IoT terminal, which may for example be a fixed, portable, pocket-sized, handheld, computer-built-in or vehicle-mounted device. For example, the UE may be a station (STA), a subscriber unit, a subscriber station, a mobile station, a mobile, a remote station, an access point, a remote terminal, an access terminal, a user terminal or a user agent. Alternatively, the UE may also be a device of an unmanned aerial vehicle. Alternatively, the UE may also be a vehicle-mounted device, for example, a trip computer with a wireless communication function, or a wireless terminal externally connected to the trip computer. Alternatively, the UE may also be a roadside device, for example, a streetlight, a signal light, or other roadside device with a wireless communication function.

In an embodiment of the present disclosure, the communication method according to the embodiment of the present disclosure is applied in a 5G ProSe L3 U2N relay scenario.

In an embodiment of the present disclosure, the first link may include a Uu link.

Further, in an embodiment of the present disclosure, the UP security policy may include at least one of: a policy of UP integrity protection; or a policy of UP encryption protection.

On this basis, in an embodiment of the present disclosure, the activation status of the UP security policy of the first link between the relay UE and the base station may include at least one of: whether the policy of UP integrity protection is activated; or whether the policy of UP encryption protection is activated At 102, UP security of a second link between the relay UE and a remote UE is activated based on the activation status of the UP security policy of the first link.

In an embodiment of the present disclosure, the second link may include a PC5 link.

In an embodiment of the present disclosure, the method for activating the UP security of the second link between the relay UE and the remote UE based on the activation status of the UP security policy of the first link may include: enabling the activation status of the UP security policy of the second link to be consistent with the activation status of the UP security policy of the first link, which ensures that the activation status of the UP security policy of the second link is aligned with the activation status of the UP security policy of the first link.

To sum up, the communication method according to the embodiment of the present disclosure, the relay UE may determine the activation status of the UP security policy of the first link between the relay UE itself and the base station, and activates the UP security of the second link between the relay UE and the remote UE based on the activation status of the UP security policy of the first link. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected.

As such, end-to-end security of communication between the remote UE and the base station is ensured and the communication security is improved.

Figure 2:
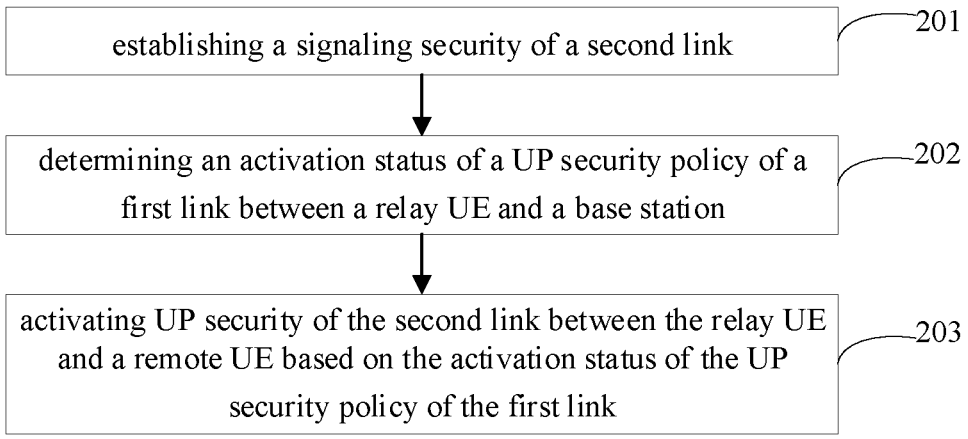
FIG. 2 is a schematic flowchart of a communication method as applied to a relay UE according to another embodiment of the present disclosure.

FIG. 2 is a schematic flowchart of a communication method according to another embodiment of the present disclosure, applied to a relay UE. As shown in FIG. 2, the communication method may include the following steps at 201-203.

At 201, a signaling security of a second link is established.

In an embodiment of the present disclosure, the second link may include a PC5 link between the relay UE and a remote UE.

In an embodiment of the present disclosure, a method for establishing the signaling security of the second link may include the following steps.

At step a, a Direct Communication Request message sent by the remote UE is obtained.

At step b, a Relay Key Request message is sent to a core network device based on the Direct Communication Request message. The Relay Key Request message may include a Relay Service Code.

In an embodiment of the present disclosure, the relay UE sends the Relay Key Request message specifically to 5GPKMF in the core network device.

In an embodiment of the present disclosure, after the 5GPKMF receives the Relay Key Request message, the 5GPKMF may authenticate the remote UE and the relay UE based on the Relay Service Code in the Relay Key Request message, and determine whether to authorize the remote UE and the relay UE based on an authentication result. When it is determined to authorize the remote UE and the relay UE, the 5GPKMF may send an authorization message to the relay UE.

In an embodiment of the present disclosure, after the 5GPKMF receives the Relay Key Request message sent by the relay UE, the 5GPKMF also determines 5GPRUK, and 5GPRUK ID and 5GPRUK_Info corresponding to the 5GPRUK; the 5GPKMF also determines the $5G\_K_{NRP}$ Freshness Parameter, and generates the $5G\_K_{NRP}$ based on the 5GPRUK, $5G\_K_{NRP}$ Freshness Parameter, Nonce_1, and the Relay Service Code. Then, the 5GPKMF may use the $5G\_K_{NRP}$ as an intermediate key parameter, use the $5G\_K_{NRP}$ Freshness Parameter and 5GPRUK_Info as intermediate key related parameters, and send them to the relay UE, so that the relay UE may subsequently establish a signaling security of a second link based on the intermediate key parameter.

At step c, an authorization message, an intermediate key parameter and intermediate key related parameters sent by the core network device are obtained.

In an embodiment of the present disclosure, the relay UE specifically obtains the authorization message, the intermediate key parameter and the intermediate key related parameters sent by the 5GPKMF in the core network device.

In an embodiment of the present disclosure, interaction between the core network device and the relay UE is implemented by a base station or other devices. For the convenience of description, sending by the core network device to the UE via the base station or other devices in the embodiments of the present disclosure is called sending by the core network device to the UE. Similarly, sending by the UE to the core network device via the base station or other devices is called sending by the UE to the core network device.

At step d, a session key is determined based on the intermediate key parameter. The session key is used to protect the signaling security of the second link.

At step e, a Direct Security Mode Command message is sent to the remote UE.

The Direct Security Mode Command message is protected by the session key, and the Direct Security Mode Command message may include the above intermediate key related parameters which are the $5G\_K_{NRP}$ Freshness Parameter and 5GPRUK_Info.

For example, in an embodiment of the present disclosure, the relay UE may send the $5G\_K_{NRP}$ Freshness and 5GPRUK_Info to the remote UE via the Direct Security Mode Command message, so that the remote UE may determine the 5GPRUK based on the 5GPRUK_Info, further determine the 5GPRUK ID, and generate the $5G\_K_{NRP}$ and the session key for protecting the signaling security of the second link based on the $5G\_K_{NRP}$ Freshness parameter.

At step f, a Direct Security Mode Complete message sent by the remote UE is received. The Direct Security Mode Complete message is protected by the session key.

At this point, the step 201 is completed, and the signaling security of the second link has been successfully established between the relay UE and the remote UE. When the relay UE and the remote UE subsequently interact via the second link, the security of the interacted signaling may be protected, which ensures the security of signaling transmission.

At 202, an activation status of a UP security policy of a first link between the relay UE and a base station is determined.

At 203, UP security of the second link between the relay UE and the remote UE is activated based on the activation status of the UP security policy of the first link.

The detailed description of the steps 202-203 may refer to the relevant description in the above embodiments, and the embodiments of the present disclosure will not be repeated here.

To sum up, in the communication method according to the embodiment of the present disclosure, the relay UE may determine the activation status of the UP security policy of the first link between the relay UE itself and the base station, and activates the UP security of the second link between the relay UE and the remote UE based on the activation status of the UP security policy of the first link. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 3:
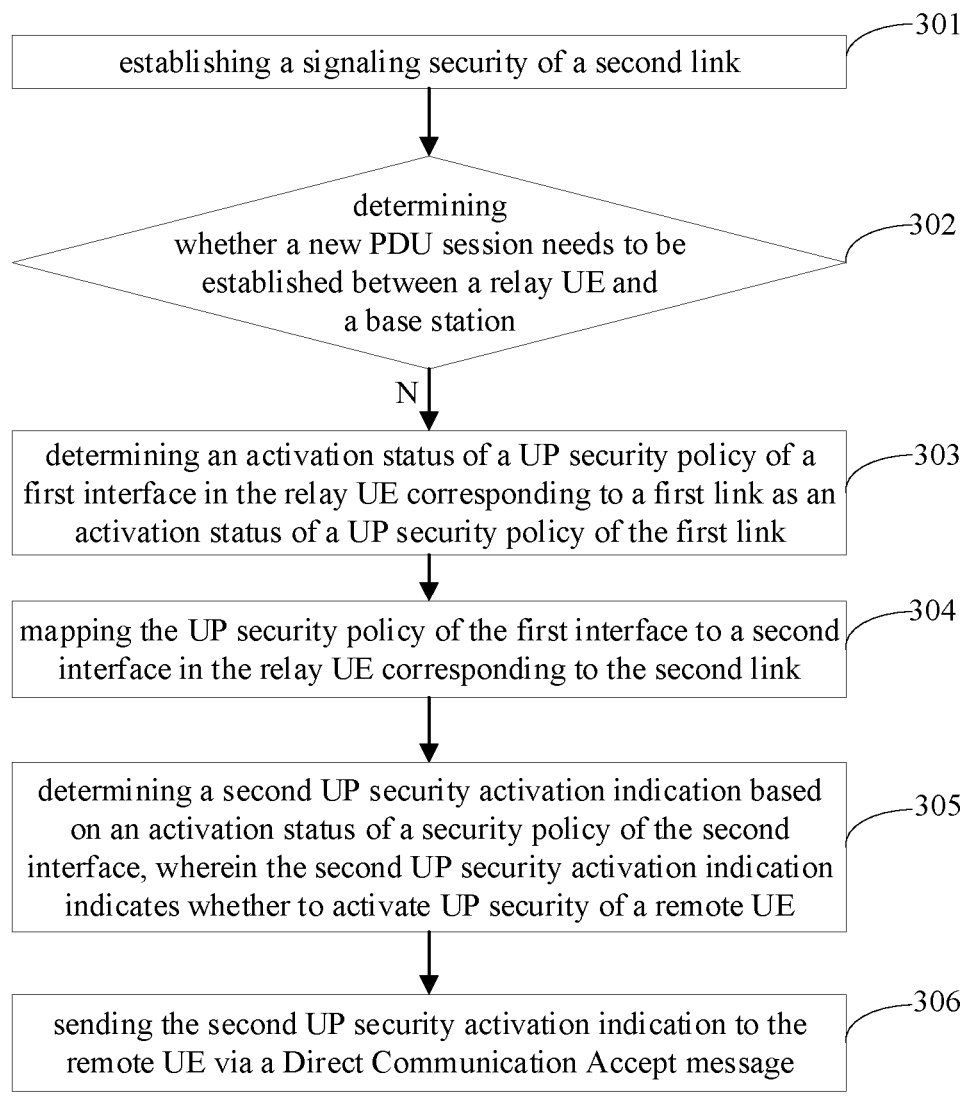
FIG. 3 is a schematic flowchart of a communication method as applied to a relay UE according to yet another embodiment of the present disclosure.

FIG. 3 is a schematic flowchart of a communication method according to yet another embodiment of the present disclosure, applied to a relay UE. As shown in FIG. 3, the communication method may include the following steps at 301-306.

At 301, a signaling security of a second link is established.

The detailed description of the step 301 may refer to the relevant description in the above embodiments, and the embodiments of the present disclosure will not be repeated here.

At 302, it is determined whether there is a need to establish a new PDU session between a relay UE and a base station. When there is no need to establish a new PDU session, the step 303 is executed.

It should be noted that in an embodiment of the present disclosure, since when the relay UE establishes a PDU session, the core network device may configure a UP security policy of the PDU session to the base station. That is, when the relay UE establishes a PDU session, the relay UE may activate the UP security policy of the PDU session simultaneously. Therefore, when it is determined in the step 302 that there is no need to establish a new PDU session between the relay UE and the base station, it means that a PDU session for relaying has been established between the relay UE and the base station. In other words, the UP security policy of the first link between the relay UE and the base station has been activated, and the step 303 may be then continued.

At 303, an activation status of a UP security policy of a first interface in the relay UE corresponding to a first link is determined as an activation status of a UP security policy of the first link.

In an embodiment of the present disclosure, the first interface may include a Uu interface.

In an embodiment of the present disclosure, the UP security policy may include at least one of: a policy of UP integrity protection; or a policy of UP encryption protection.

In an embodiment of the present disclosure, the activation status of the UP security policy may include at least one of: whether to activate the policy of UP integrity protection; or whether to activate the policy of UP encryption protection.

At 304, the UP security policy of the first interface is mapped to a second interface in the relay UE corresponding to the second link.

In an embodiment of the present disclosure, the second interface may include a PC5-U interface.

In an embodiment of the present disclosure, the method for mapping the UP security activation status of the first interface to the second interface in the relay UE corresponding to the second link may include: mapping by the relay UE, a UP security activation status corresponding to a packet data convergence protocol (PDCP) layer of its first interface to a PDCP layer of the second interface, so that the activation status of the UP security policy of the second interface in the relay UE is consistent with the activation status of the UP security policy of the first interface.

For example, in an embodiment of the present disclosure, if the UP security policy activation status of the first interface in the relay UE is that both the policy of UP integrity protection and the policy of UP encryption protection have been activated, the relay UE may map "both the policy of UP integrity protection and the policy of UP encryption protection have been activated" of the first interface to the second interface, so that the activation status of the UP security policy of the second interface is also that "both the policy of UP integrity protection and the policy of UP encryption protection have been activated".

At 305, a second UP security activation indication is determined based on an activation status of a security policy of the second interface. The second UP security activation indication indicates whether to activate UP security of the remote UE.

In an embodiment of the present disclosure, the second UP security activation indication is specifically determined based on the activation status of the security policy of the second interface in the relay UE, so as to ensure the activation status of the UP security policy of the remote UE to align with the activation status of the UP security policy of the relay UE.

Specifically, in an embodiment of the present disclosure, when the activation status of the security policy of the second interface in the relay UE is "both the policy of UP integrity protection and the policy of UP encryption protection have been activated", the second UP security activation indication may be activating UP integrity protection and activating UP encryption protection.

At 306, the second UP security activation indication is sent to the remote UE via a Direct Communication Accept message.

In an embodiment of the present disclosure, after the remote UE obtains the second UP security activation indication sent by the relay UE, the remote UE may activate the UP security of the remote UE according to the second UP security activation indication.

Going to the step 306, the UP security policy in the second link between the relay UE and the remote UE is successfully established. When the relay UE subsequently interacts with the remote UE, data transmission may be protected by the UP security policy, thus ensuring the security of data transmission.

To sum up, in the communication method according to the embodiment of the present disclosure, the relay UE may determine the activation status of the UP security policy of the first link between the relay UE itself and the base station, and activates the UP security of the second link between the relay UE and the remote UE based on the activation status of the UP security policy of the first link. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 4:
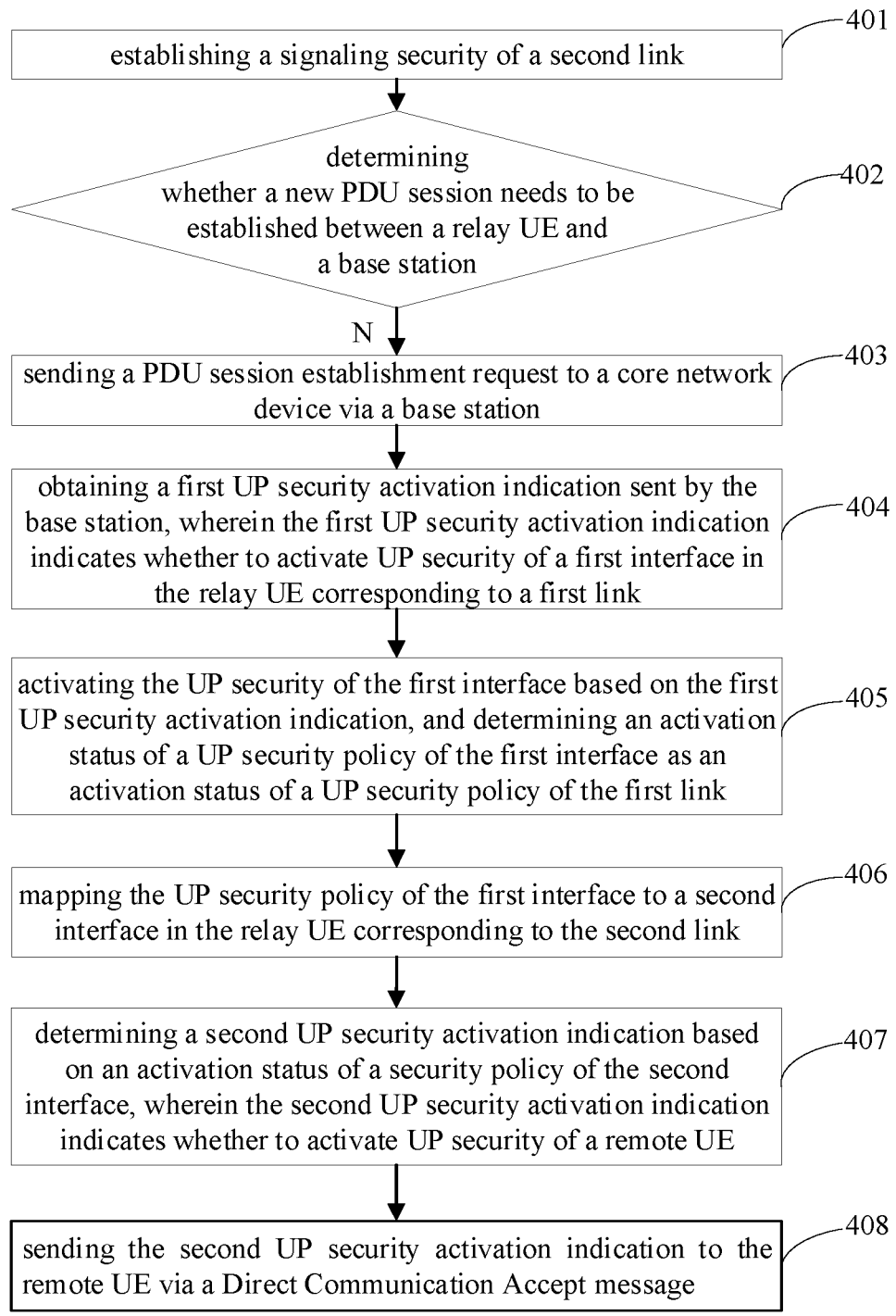
FIG. 4 is a schematic flowchart of a communication method as applied to a relay UE according to yet another embodiment of the present disclosure.

FIG. 4 is a schematic flowchart of a communication method according to yet another embodiment of the present disclosure, applied to a relay UE. As shown in FIG. 4, the communication method may include the following steps at 401-408.

At 401, a signaling security of a second link is established.

The detailed introduction to the step 401 may refer to the relevant description in the above embodiments, and the embodiments of the present disclosure will not be repeated here.

At 402, it is determined whether there is a need to establish a new PDU session between the relay UE and the base station. When there is no need to establish a new PDU session, the step 403 is executed.

In an embodiment of the present disclosure, when the relay UE determines there is a need to establish a new PDU session, it means that the PDU session for relaying has not been established between the relay UE and the base station. In other words, a core network device has not yet configured a UP security policy for the relay UE and the base station. Therefore, the step 403 needs to be continued.

At 403, a PDU session establishment request is sent to a core network device via a base station.

In an embodiment of the present disclosure, after the core network device receives the PDU session establishment request, the core network device sets the UP security policy according to the PDU session establishment request and sends an N2 PDU session request message to the base station. The N2 PDU session request message includes session management information which contains the UP security policy. After receiving the UP security policy, the base station activates a UP security policy of the base station based on the received UP security policy, and sends a first UP security activation indication to the relay UE based on the UP security policy. The first UP security activation indication indicates whether to activate UP security of a first interface in the relay UE corresponding to the first link.

It should be noted that, in an embodiment of the present disclosure, the first UP security activation indication is specifically determined based on the UP security policy configured by the core network device, and is used to ensure the activation status of the UP security policy of the base station is aligned with the activation status of the UP security policy of the relay UE.

For example, in an embodiment of the present disclosure, if the core network device configures that the UP security policy of the Uu interface of the base station is activating UP integrity protection and activating UP encryption protection, the first UP security activation indication may include: activating UP integrity protection and activating UP encryption protection.

In an embodiment of the present disclosure, the method for the base station to send the first UP security activation indication to the relay UE may include: sending the first UP security activation indication to the relay UE by using radio resource control (RRC) connection reconfiguration process according to 3GPP TS 33.501 [4].

At 404, a first UP security activation indication sent by the base station is obtained.

At 405, UP security of a first interface is activated based on the first UP security activation indication, and an activation status of a UP security policy of a first interface is determined as the activation status of the UP security policy of the first link.

Going to the step 405, the UP security policy in the first link between the relay UE and the base station is successfully established. When the relay UE subsequently interacts with the base station, data transmission may be protected by the UP security policy, thus ensuring the security of data transmission.

At 406, the UP security policy of the first interface is mapped to a second interface in the relay UE corresponding to the second link.

At 407, a second UP security activation indication is determined based on the activation status of the security policy of the second interface. The second UP security activation indication indicates whether to activate UP security of a remote UE.

At 408, the second UP security activation indication is sent to the remote UE via a Direct Communication Accept message.

Going to the step 406, the UP security policy in the second link between the relay UE and the remote UE is successfully established. When the relay UE subsequently interacts with the remote UE, the data transmission may be protected by the UP security policy, thus ensuring the security of data transmission.

The detailed description of the steps 406-408 may refer to the relevant description in the above embodiments, and the embodiments of the present disclosure will not be repeated here.

To sum up, in the communication method according to the embodiment of the present disclosure, the relay UE may determine the activation status of the UP security policy of the first link between the relay UE itself and the base station, and activates the UP security of the second link between the relay UE and the remote UE based on the activation status of the UP security policy of the first link. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 5:
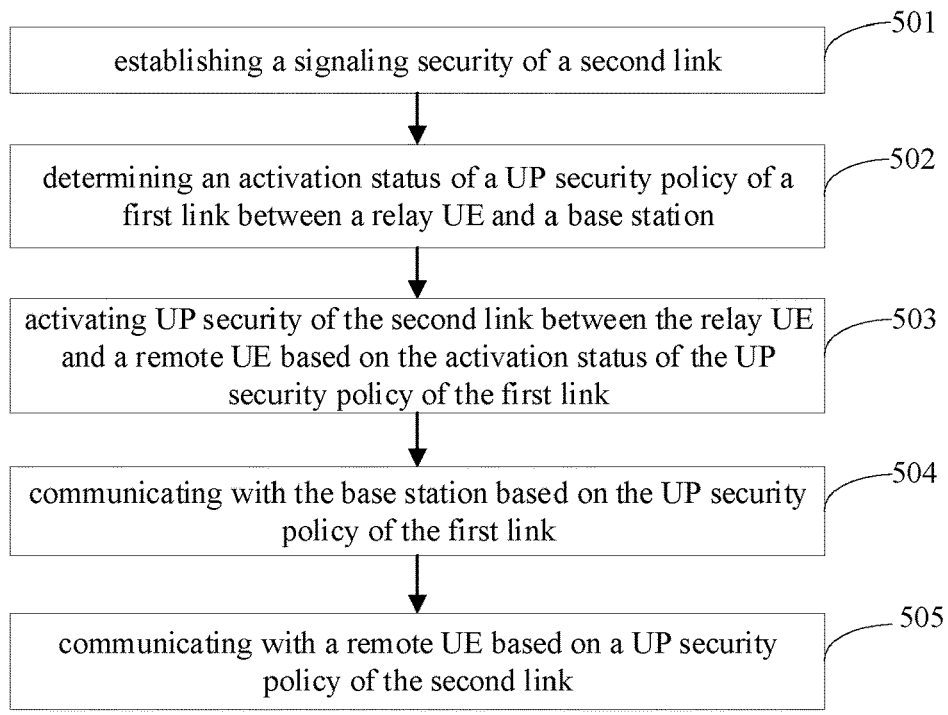
FIG. 5 is a schematic flowchart of a communication method as applied to a relay UE according to yet another embodiment of the present disclosure.

FIG. 5 is a schematic flowchart of a communication method according to yet another embodiment of the present disclosure, applied to a relay UE. As shown in FIG. 5, the communication method may include the following steps at 501-505.

At 501, a signaling security of a second link is established.

At 502, it is determined an activation status of a UP security policy of a first link between a relay UE and a base station.

At 503, UP security of the second link between the relay UE and a remote UE is activated based on the activation status of the UP security policy of the first link.

At 504, communication with the base station is performed based on the UP security policy of the first link.

At 505, communication with the remote UE is performed based on the UP security policy of the second link.

To sum up, in the communication method according to the embodiment of the present disclosure, the relay UE may determine the activation status of the UP security policy of the first link between the relay UE itself and the base station, and activates the UP security of the second link between the relay UE and the remote UE based on the activation status of the UP security policy of the first link. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 6:
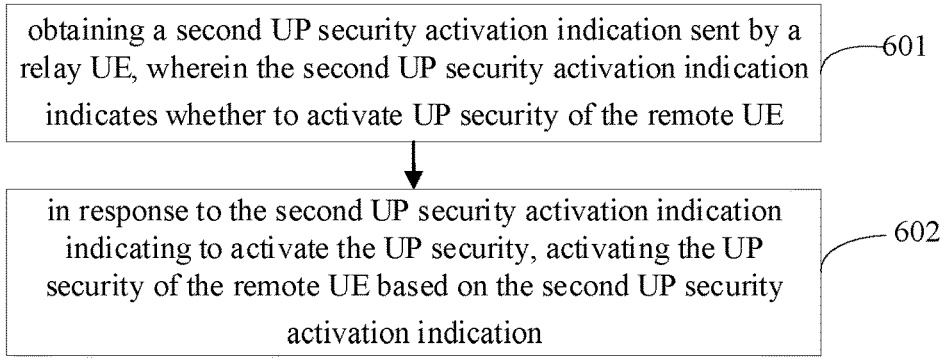
FIG. 6 is a schematic flowchart of a communication method as applied to a remote UE according to yet another embodiment of the present disclosure.

FIG. 6 is a schematic flowchart of a communication method according to yet another embodiment of the present disclosure, applied to a remote UE. As shown in FIG. 6, the communication method may include the following steps at 601-602.

At 601, a second UP security activation indication sent by the relay UE is obtained. The second UP security activation indication indicates whether to activate UP security of the remote UE.

In an embodiment of the present disclosure, the method for the remote UE to obtain the second UP security activation indication sent by the relay UE may include: obtaining the second UP security activation indication sent by the relay UE via a Direct Communication Accept message.

Also, the detailed description of the second UP security activation indication may refer to the relevant description in the above embodiments, and the embodiments of the present disclosure will not be repeated here.

At 602, when the second UP security activation indication indicates to activate the UP security, UP security of the remote UE is activated based on the second UP security activation indication.

To sum up, in the communication method according to the embodiment of the present disclosure, the remote UE may obtain the second UP security activation indication sent by the relay UE, in which the second UP security activation indication indicates whether to activate the UP security of the remote UE, and when the second UP security activation indication indicates to activate the UP security, the remote UE activates the UP security of the remote UE based on the second UP security activation indication. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 7:
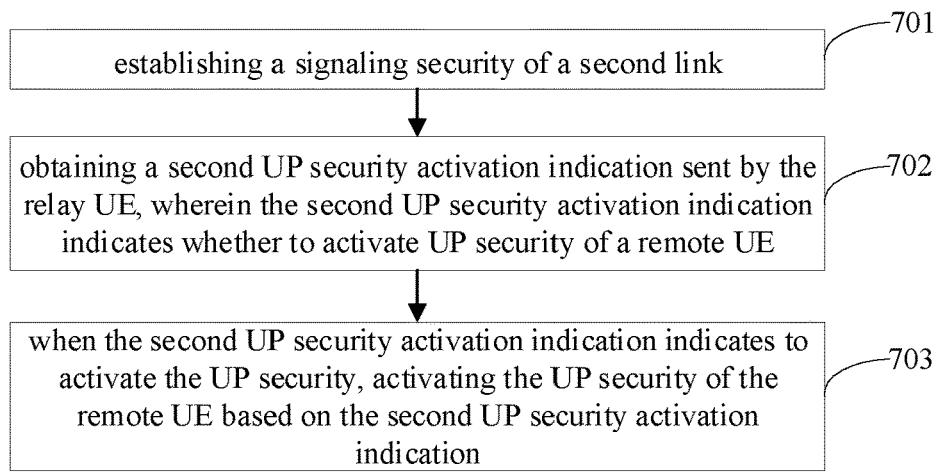
FIG. 7 is a schematic flowchart of a communication method as applied to a remote UE according to yet another embodiment of the present disclosure.

FIG. 7 is a schematic flowchart of a communication method according to yet another embodiment of the present disclosure, applied to a remote UE. As shown in FIG. 7, the communication method may include the following steps 701-703.

At 701, a signaling security of a second link is established.

In an embodiment of the present disclosure, the method for establishing the signaling security of the second link may include the following steps at a to f.

At step a, a Direct Communication Request message is sent to the relay UE.

At step b, a Direct Security Mode Command message sent by the relay UE is obtained. The Direct Security Mode Command message is protected by a session key, and the Direct Security Mode Command message may include intermediate key related parameters (i.e., $5G\_K_{NRP}$ Freshness and 5GPRUK_Info).

At step c, the session key is determined based on the intermediate key related parameters.

In an embodiment of the present disclosure, the method for the remote UE to determine the session key based on the intermediate key related parameters may include: first determining an intermediate key based on the intermediate key related parameters, and then determining the session key based on the intermediate key.

For example, in an embodiment of the present disclosure, the remote UE may obtain the Direct Security Mode Command message sent by the relay UE so as to obtain the $5G\_K_{NRP}$ Freshness and 5GPRUK_Info parameters. Then, the remote UE may determine 5GPRUK based on the 5GPRUK_Info, and determine 5GPRUK ID for storage, and generate $5G\_K_{NRP}$ and a session key used to protect the signaling security of the second link, based on the $5G\_K_{NRP}$ Freshness parameter.

At this point, the step 701 is completed, and the signaling security of the second link has been successfully established between the remote UE and the relay UE. When the remote UE and the relay UE subsequently interact via the second link, the security of the interacted signaling may be protected, which ensures the security of signaling transmission.

At 702, a second UP security activation indication sent by the relay UE is obtained. The second UP security activation indication indicates whether to activate UP security of the remote UE.

At 703, when the second UP security activation indication indicates to activate the UP security, the UP security of the remote UE is activated based on the second UP security activation indication.

The detailed description of the steps 702-703 may refer to the relevant description in the above embodiments, and the embodiments of the present disclosure will not be repeated here.

To sum up, in the communication method according to the embodiment of the present disclosure, the remote UE may obtain the second UP security activation indication sent by the relay UE, in which the second UP security activation indication indicates whether to activate the UP security of the remote UE, and when the second UP security activation indication indicates to activate the UP security, the remote UE activates the UP security of the remote UE based on the second UP security activation indication. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 8:
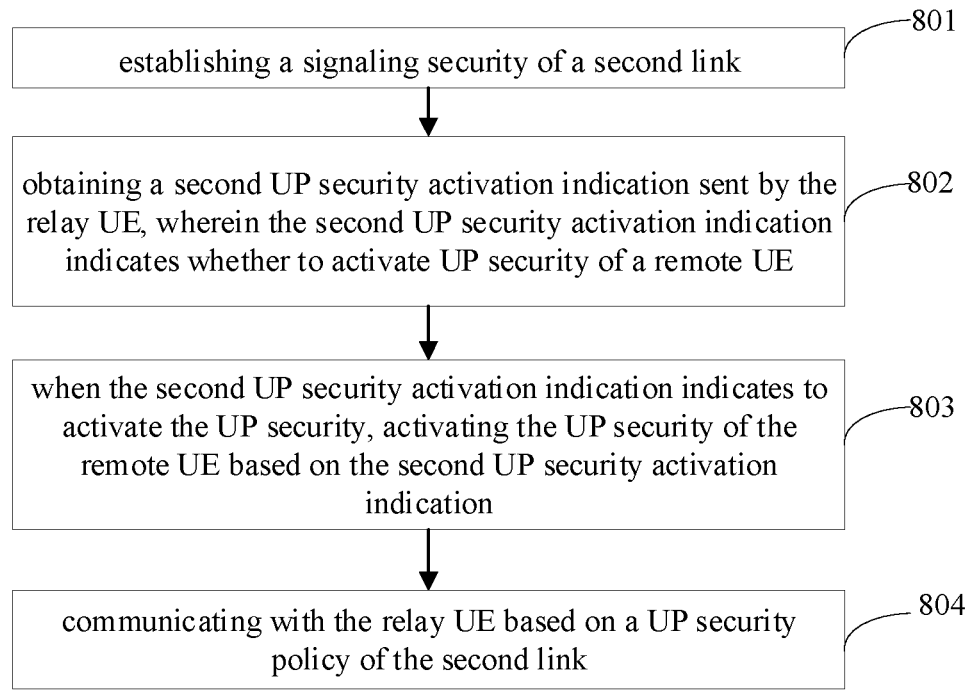
FIG. 8 is a schematic flowchart of a communication method as applied to a remote UE according to yet another embodiment of the present disclosure.

FIG. 8 is a schematic flowchart of a communication method according to yet another embodiment of the present disclosure, applied to a remote UE. As shown in FIG. 8, the communication method may include the following steps at 801-804.

At 801, a signaling security of a second link is established.

At 802, a second UP security activation indication sent by a relay UE is obtained. The second UP security activation indication indicates whether to activate UP security of the remote UE.

At 803, when the second UP security activation indication indicates to activate the UP security, the UP security of the remote UE is activated based on the second UP security activation indication.

The detailed description of the steps 801-803 may refer to the relevant description in the above embodiments, and the embodiments of the present disclosure will not be repeated here.

At 804, communication with the relay UE is performed based on the UP security policy of the second link.

To sum up, in the communication method according to the embodiment of the present disclosure, the remote UE may obtain the second UP security activation indication sent by the relay UE, in which the second UP security activation indication indicates whether to activate the UP security of the remote UE, and when the second UP security activation indication indicates to activate the UP security, the remote UE activates the UP security of the remote UE based on the second UP security activation indication. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 9:
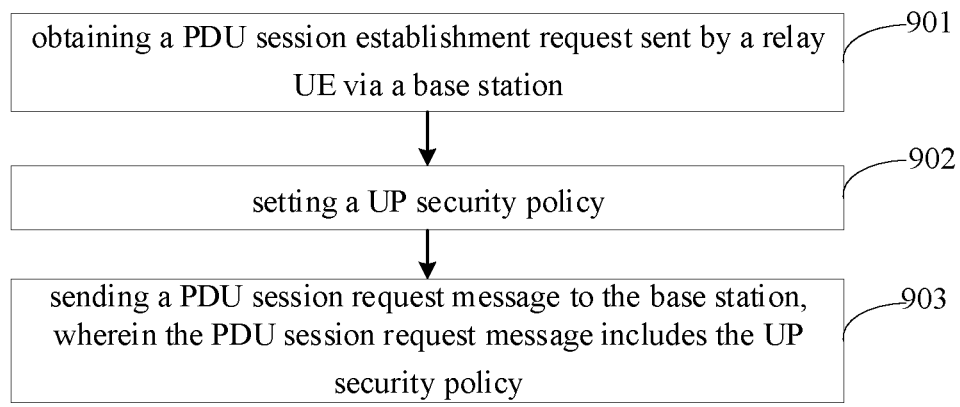
FIG. 9 is a schematic flowchart of a communication method as applied to a core network device according to yet another embodiment of the present disclosure.

FIG. 9 is a schematic flowchart of a communication method according to yet another embodiment of the present disclosure, applied to a core network device. As shown in FIG. 9, the communication method may include the following steps at 901-903.

At 901, a PDU session establishment request sent by a relay UE is obtained via a base station.

At 902, a UP security policy is set.

In an embodiment of the present disclosure, the core network device may set the UP security policy for the PDU session used for relaying, according to 3GPP TS 33.501 [4] and/or TS23.502 [5].

At 903, a PDU session request message is sent to the base station. The PDU session request message includes the UP security policy.

To sum up, in the communication method according to the embodiment of the present disclosure, the core network device may obtain the PDU session establishment request sent by the relay UE via the base station, set the UP security policy, and send the N2 PDU session request message to the base station, in which the N2 PDU session request message includes session management information which contains the UP security policy. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 10:
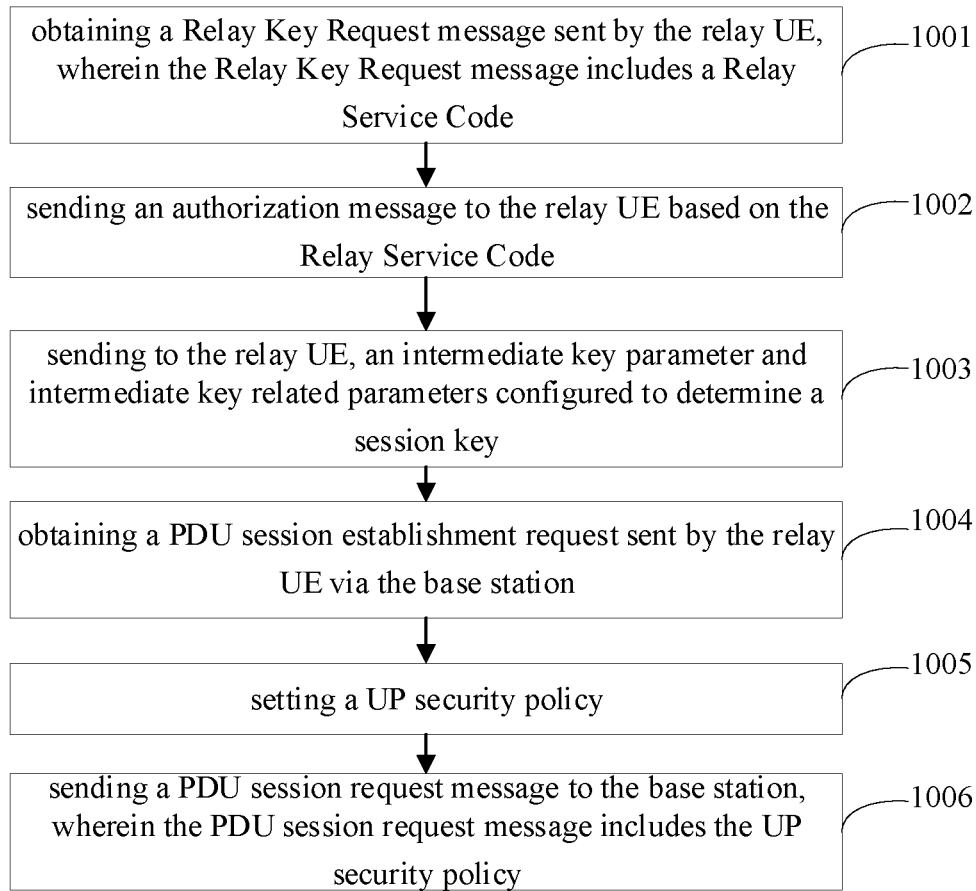
FIG. 10 is a schematic flowchart of a communication method as applied to a core network device according to yet another embodiment of the present disclosure.

FIG. 10 is a schematic flowchart of a communication method according to yet another embodiment of the present disclosure, applied to a core network device. As shown in FIG. 10, the communication method may include the following steps at 1001-1006.

At 1001, a Relay Key Request message sent by a relay UE is obtained. The Relay Key Request message includes a Relay Service Code.

In an embodiment of the present disclosure, specifically, the 5GPKMF in the core network device obtains the Relay Key Request message sent by the relay UE.

At 1002, an authorization message is sent to the relay UE based on the Relay Service Code.

In an embodiment of the present disclosure, after the 5GPKMF receives the Relay Key Request message, the 5GPKMF may authenticate the remote UE and the relay UE based on the Relay Service Code in the Relay Key Request message, and determine whether or not to authorize the remote UE and the relay UE based on an authentication result. When it is determined to authorize, an authorization message may be sent to the relay UE.

At 1003, an intermediate key parameter and intermediate key related parameters used to determine a session key to the relay UE are sent.

In an embodiment of the present disclosure, the intermediate key parameter may include $5G\_K_{NRP}$, and the intermediate key related parameters may include $5G\_K_{NRP}$ Freshness and 5GPRUK_Info.

In an embodiment of the present disclosure, after the 5GPKMF receives the Relay Key Request message sent by the relay UE, the 5GPKMF determines 5GPRUK5GPRUK ID and 5GPRUK_Info corresponding to the 5GPRUK; the 5GPKMF also determines the $5G\_K_{NRP}$ Freshness Parameter, and generates the $5G\_K_{NRP}$ based on the 5GPRUK, $5G\_K_{NRP}$ Freshness Parameter, Nonce_1, and the Relay Service Code. Then, the 5GPKMF may determine the $5G\_K_{NRP}$ as an intermediate key parameter, determine the $5G\_K_{NRP}$ Freshness Parameter and 5GPRUK_Info as intermediate key related parameters, and send them to the relay UE, so that the relay UE and the remote UE may subsequently establish a signaling security of a second link based on the intermediate key parameter and the intermediate key related parameters.

At 1004, a PDU session establishment request sent by the relay UE is obtained via the base station.

At 1005, a UP security policy is set.

At 1006, a PDU session request message is sent to the base station. The PDU session request message includes the UP security policy.

The detailed description of the steps at 1004-1006 may refer to the relevant description in the above embodiments, and the embodiments of the present disclosure will not be repeated here.

To sum up, in the communication method according to the embodiment of the present disclosure, the core network device may obtain the PDU session establishment request sent by the relay UE via the base station, set the UP security policy, and send the N2 PDU session request message to the base station, in which the N2 PDU session request message includes session management information which contains the UP security policy. That is to say, the method of the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 11:
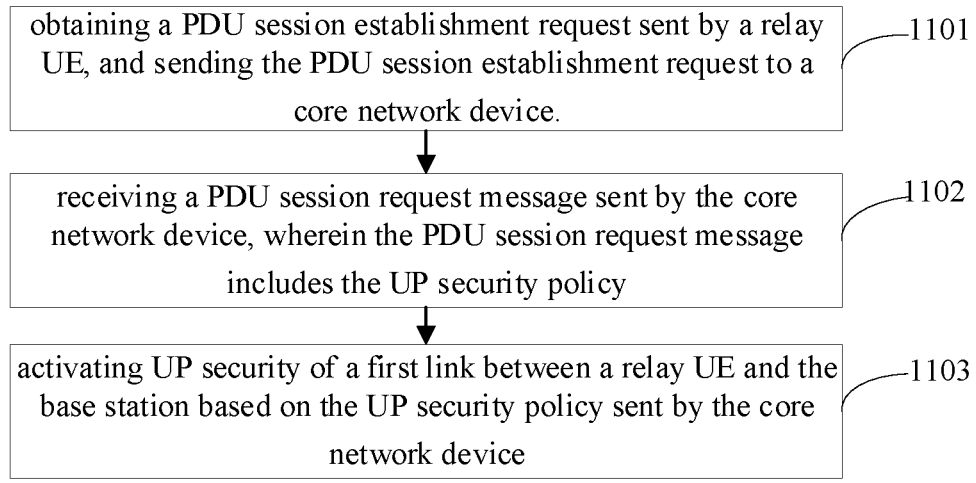
FIG. 11 is a schematic flowchart of a communication method as applied to a base station according to yet another embodiment of the present disclosure.

FIG. 11 is a schematic flow chart of a communication method according to another embodiment of the present disclosure, applied to a base station. As shown in FIG. 11, the communication method may include the following steps at 1101-1103.

At 1101, a PDU session establishment request sent by a relay UE is obtained, and the PDU session establishment request is sent to a core network device.

At 1102, a PDU session request message sent by the core network device is received, in which the PDU session request message includes the UP security policy.

The detailed description of the UP security policy may refer to the relevant description in the above embodiments, and the embodiment of the disclosure will not be repeated here.

At 1103, UP security of a first link between a relay UE and the base station is activated based on the UP security policy sent by the core network device.

The detailed description of the first link may refer to the relevant description in the above-mentioned embodiments, and the embodiment of the present disclosure will not be repeated here.

To sum up, in the communication method according to the embodiment of the present disclosure, the base station may obtain the PDU session establishment request sent by the relay UE, and send the PDU session establishment request to the core network device; then the base station may receive the N2 PDU session request message sent by the core network device, in which the N2 PDU session request message includes session management information which contains the UP security policy, and activates the UP security of the first link between the relay UE and the base station based on the UP security policy sent by the core network device. That is to say, the method of the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 12:
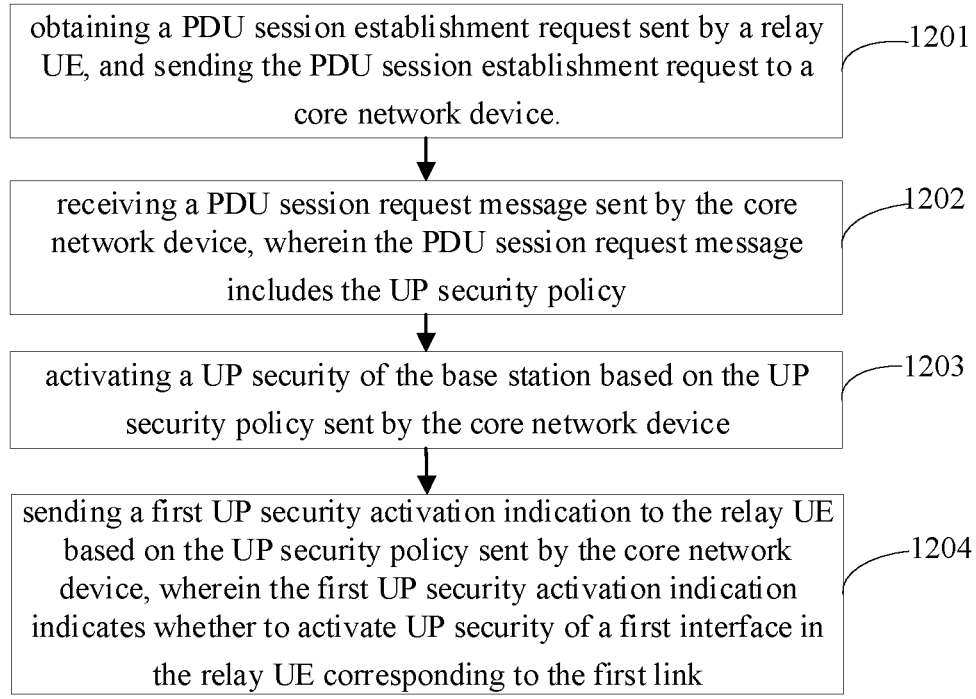
FIG. 12 is a schematic flowchart of a communication method as applied to a base station according to yet another embodiment of the present disclosure.

FIG. 12 is a schematic flowchart of a communication method according to another embodiment of the present disclosure, applied to a base station. As shown in FIG. 12, the communication method may include the following steps at 1201-1204.

At 1201, a PDU session establishment request sent by a relay UE is obtained, and the PDU session establishment request is sent to a core network device.

At 1202, a PDU session request message sent by the core network device is received, in which the PDU session request message includes the UP security policy.

The detailed description of the steps 1201-1202 may refer to the relevant description in the above embodiments, and the embodiments of the present disclosure will not be repeated here.

At 1203, a UP security of the base station is activated based on the UP security policy sent by the core network device.

At 1204, a first UP security activation indication is sent to the relay UE based on the UP security policy sent by the core network device. The first UP security activation indication indicates whether to activate UP security of a first interface in the relay UE corresponding to the first link.

The detailed description of the first link make refer to the relevant description in the above-mentioned embodiments, and the embodiments of the present disclosure will not be repeated here.

To sum up, in the communication method according to the embodiment of the present disclosure, the base station may obtain the PDU session establishment request sent by the relay UE, and send the PDU session establishment request to the core network device; then the base station may receive the N2 PDU session request message sent by the core network device, in which the N2 PDU session request message includes session management information which contains the UP security policy, and activates the UP security of the first link between the relay UE and the base station based on the UP security policy sent by the core network device. That is to say, the method of the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 13:
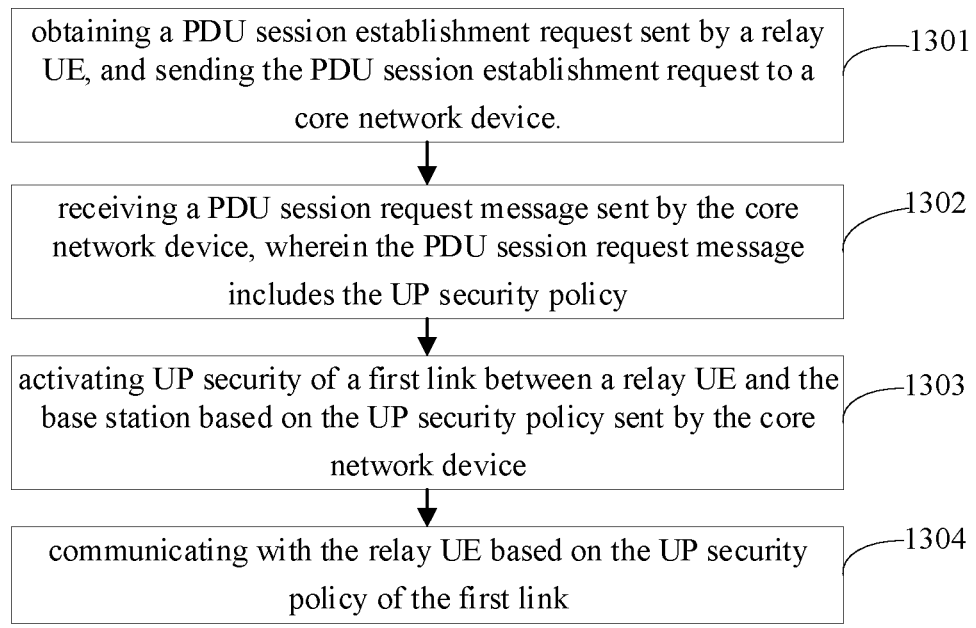
FIG. 13 is a schematic flowchart of a communication method as applied to a base station according to yet another embodiment of the present disclosure.

FIG. 13 is a schematic flowchart of a communication method according to yet another embodiment of the present disclosure, applied to a base station. As shown in FIG. 13, the communication method may include the following steps at 1301-1304.

At 1301, a PDU session establishment request sent by a relay UE is obtained, and the PDU session establishment request is sent to a core network device.

At 1302, a PDU session request message sent by the core network device is received, in which the PDU session request message includes the UP security policy.

At 1303, UP security of a first link between a relay UE and the base station is activated based on the UP security policy sent by the core network device.

The detailed description of the steps 1301-1303 may refer to the relevant description in the above embodiments, and the embodiments of the present disclosure will not be repeated here.

At 1304, communication with the relay UE is performed based on the UP security policy of the first link.

To sum up, in the communication method according to the embodiment of the present disclosure, the base station may obtain the PDU session establishment request sent by the relay UE, and send the PDU session establishment request to the core network device; then the base station may receive the N2 PDU session request message sent by the core network device, in which the N2 PDU session request message includes session management information which contains the UP security policy, and activates the UP security of the first link between the relay UE and the base station based on the UP security policy sent by the core network device. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

Figure 14:
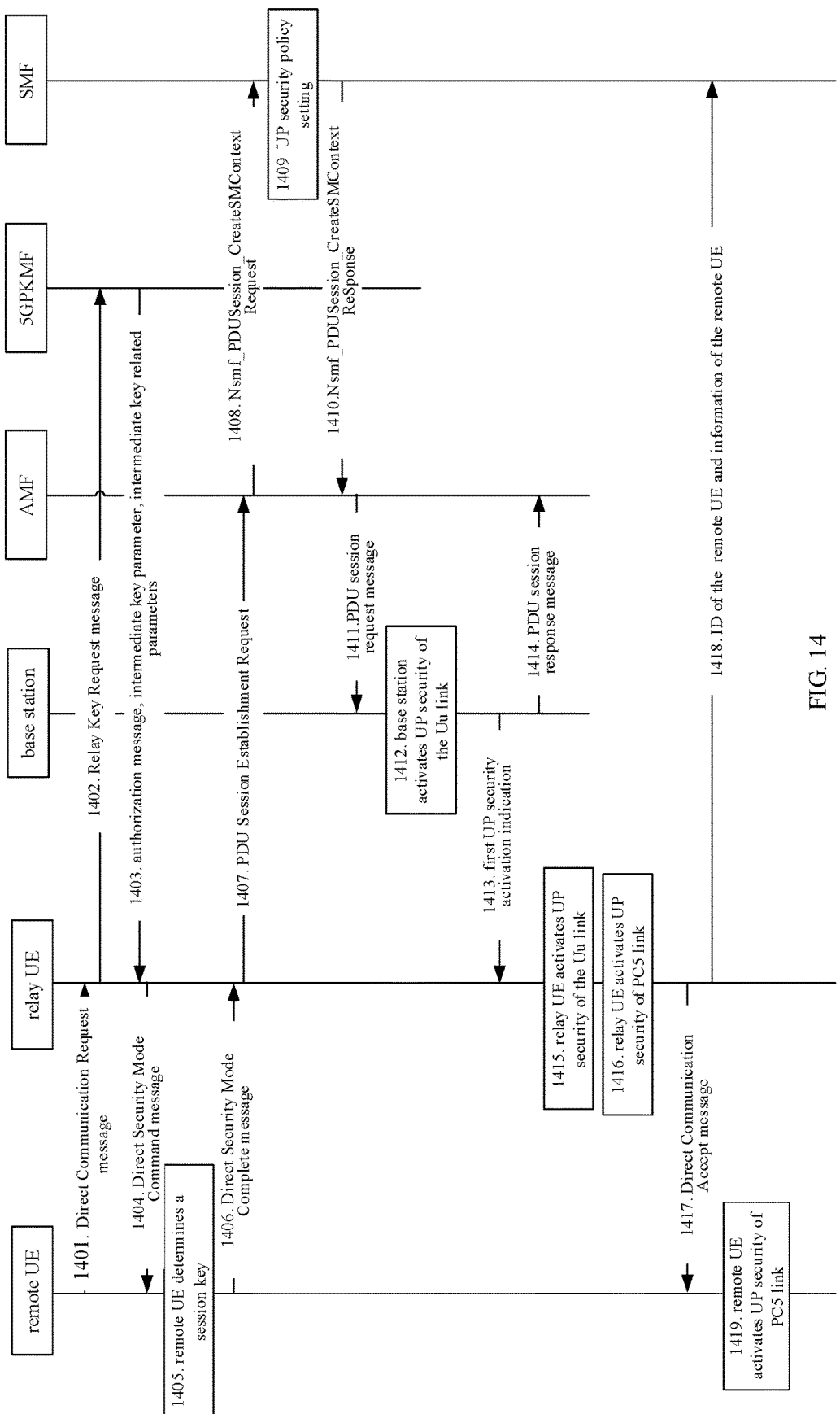
FIG. 14 is a schematic flowchart of communication interaction according to an embodiment of the present disclosure.

Based on the above description, FIG. 14 illustrates communication methods among a core network device, a base station, a relay UE and a remote UE, in which the core network device may include for example, authentication management function (AMF), 5GPKMF and session management function (SMF) according to an embodiment of the present disclosure. As shown in FIG. 14, the interaction method may include the following steps.

At 1401, a remote UE sends a Direct Communication Request message to a relay UE.

At 1402, the relay UE sends a Relay Key Request message to the 5GPKMF based on the Direct Communication Request message, in which the Relay Key Request message includes a Relay Service Code.

In an embodiment of the present disclosure, the interaction between a core network device and a relay UE is implemented via a base station or other devices. For the convenience of description, in the embodiments of the present disclosure, sending by the core network device to the UE via the base station or other devices is called sending by the core network device to the UE. Similarly, sending by the UE to the core network device via the base station or other device is called sending by the UE to the core network device.

At 1403, the 5GPKMF sends an authorization message, an intermediate key parameter and intermediate key related parameters used to determine a session key to the relay UE.

At 1404, the relay UE determines a session key (not shown in the FIG. 14) based on the intermediate key parameter, and sends a Direct Security Mode Command message to the remote UE. The Direct Security Mode Command message is protected by the session key protection, and the Direct Security Mode Command message includes the intermediate key related parameters: 5G_$K_{NRP}$ Freshness and 5GPRUK_Info.

At 1405, the remote UE generates the intermediate key parameter based on 5GPRUK_Info, and determines the session key based on the intermediate key parameter.

At 1406, the remote UE sends a Direct Security Mode Complete message to the relay UE, in which the Direct Security Mode Complete message is protected by the session key.

At 1407, the relay UE sends a PDU session establishment request to the AMF via a base station.

At 1408, the AMF sends an Nsmf_PDUSession_CreateSMContext Request message to the SMF.

At 1409, the SMF sets a UP security policy.

It should be noted that the SMF may set the UP security policy for the PDU session used for relaying according to 3GPP TS 33.501 [4] and/or TS 23.502 [5].

At 1410, the SMF sends an Nsmf_PDUSession_CreateSMContext Response message to the AMF.

At 1411, the AMF sends a PDU session request message to the base station, in which the PDU session request message includes the UP security policy.

At 1412, the base station activates UP security of a Uu link.

At 1413, the base station sends a first UP security activation indication to the relay UE based on the UP security policy, in which the first UP security activation indication indicates whether to activate UP security of a first interface in the relay UE corresponding to the first link.

At 1414, the base station sends a PDU session response message to the AMF.

At 1415, the relay UE activates UP security of the Uu link based on the first UP security activation indication.

At 1416, the relay UE activates UP security of a PC5 link based on an activation status of the UP security policy of the Uu link, and determines a second UP security activation indication based on the activation status of the security policy of the PC5 link. The second UP security activation indication indicates whether to activate UP security of the remote UE.

At 1417, the relay UE sends the second UP security activation indication to the remote UE via a Direct Communication Accept message.

At 1418, the relay UE sends an identity document (ID) of the remote UE and the information of the remote UE to the SMF.

At 1419, the remote UE activates the UP security of the remote UE based on the second UP security activation indication.

To sum up, in the interaction method according to the embodiment of the present disclosure, the relay UE may determine the activation status of the UP security policy of the first link between the relay UE itself and the base station, and activates the UP security of the second link between the relay UE and the remote UE based on the activation status of the UP security policy of the first link. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected.

As such, end-to-end security of communication between the remote UE and the base station is ensured and the communication security is improved.

Figure 15:
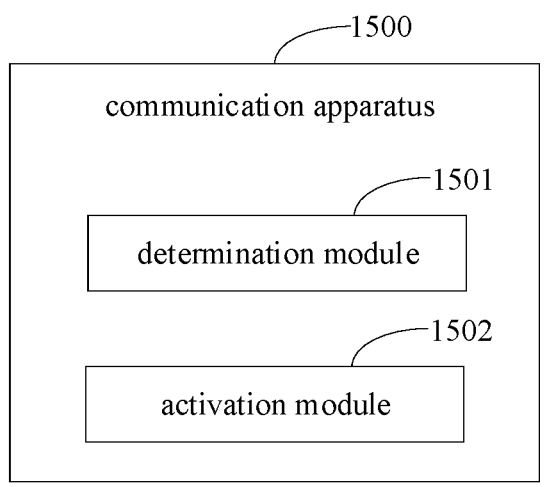
FIG. 15 is a structural diagram of a communication apparatus according to an embodiment of the present disclosure.

FIG. 15 is a structural diagram of a communication apparatus according to an embodiment of the present disclosure. As shown in FIG. 15, the apparatus 1500 may include: a determination module 1501, and an activation module 1502.

The determination module 1501 is configured to determine an activation status of a UP security policy of a first link between the relay UE and a base station.

The activation module 1502 is configured to activate UP security of a second link between the relay UE and a remote UE based on the activation status of the UP security policy of the first link.

To sum up, in the communication apparatus according to the embodiment of the present disclosure, the relay UE may determine the activation status of the UP security policy of the first link between the relay UE itself and the base station, and activates the UP security of the second link between the relay UE and the remote UE based on the activation status of the UP security policy of the first link. That is to say, the method in the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

In an embodiment of the present disclosure, the first link includes a Uu link.

Further, in another embodiment of the present disclosure, the second link includes a PC5 link.

Further, in another embodiment of the present disclosure, the above apparatus is also configured to establish a signaling security of the second link.

Further, in another embodiment of the present disclosure, the above apparatus is also configured to: obtain a Direct Communication Request message sent by the remote UE; send a Relay Key Request message to a core network device based on the Direct Communication Request message, in which the Relay Key Request message includes a Relay Service Code; obtain an authorization message sent by the core network device, an intermediate key parameter and intermediate key related parameters, in which the intermediate key parameter include 5G_$K_{NRP}$, the intermediate key related parameters include 5G_K$_{NRP}$ Freshness Parameter and 5GPRUK_Info; determine a session key based on the intermediate key parameter, in which the session key is used to protect a signaling security of a second link; send a Direct Security Mode Command message to the remote UE, in which the Direct Security Mode Command is protected by the session key, and the Direct Security Mode Command message includes the intermediate key related parameters; and receive a Direct Security Mode Complete message sent by the remote UE, in which the Direct Security Mode Complete message is protected by the session key.

Further, in another embodiment of the present disclosure, the above determination module 1501 is also configured to: determine whether there is a need to establish a new PDU session between the relay UE and the base station; and when it is determined that there is no need to establish a new PDU session, determine an activation status of a UP security policy of a first interface in the relay UE corresponding to the first link as the activation status of the UP security policy of the first link.

Further, in another embodiment of the present disclosure, the above determination module 1501 is also configured to: determine whether there is a need to establish a new PDU session between the relay UE and the base station; and when it is determined that there is a need to establish a new PDU session, send a PDU session establishment request to a core network device via the base station; obtain a first UP security activation indication sent by the base station, in which the first UP security activation indication indicates whether to activate UP security of a first interface in the relay UE corresponding to the first link; activate the UP security of the first interface based on the first UP security activation indication, and determine an activation status of a UP security policy of the first interface as the activation status of the UP security policy of the first link.

Further, in another embodiment of the present disclosure, the first interface includes a Uu interface.

Further, in another embodiment of the present disclosure, the above-mentioned activation module 1502 is also configured to: map the UP security policy of the first interface to s second interface in the relay UE corresponding to the second link; determine a second UP security activation indication based on an activation status of a security policy of the second interface, in which the second UP security activation indication indicates whether to activate UP security of the remote UE; and send the second UP security activation indication to the remote UE via a Direct Communication Accept message.

Further, in another embodiment of the present disclosure, the second interface includes a PC5-U interface.

Further, in another embodiment of the present disclosure, the above apparatus is also configured to: communicate with the base station based on the UP security policy of the first link; and communicate with the remote UE based on a UP security policy of the second link.

Further, in an embodiment of the present disclosure, the UP security policy includes at least one of: a policy of UP integrity protection; or a policy of UP encryption protection.

Further, in another embodiment of the present disclosure, the first UP security activation indication indicates at least one of: whether to activate the UP integrity protection; or whether to activate the UP encryption protection.

Further, in another embodiment of the present disclosure, the second UP security activation indication indicates at least one of: whether to activate the UP integrity protection; or whether to activate the UP encryption protection.

Figure 16:
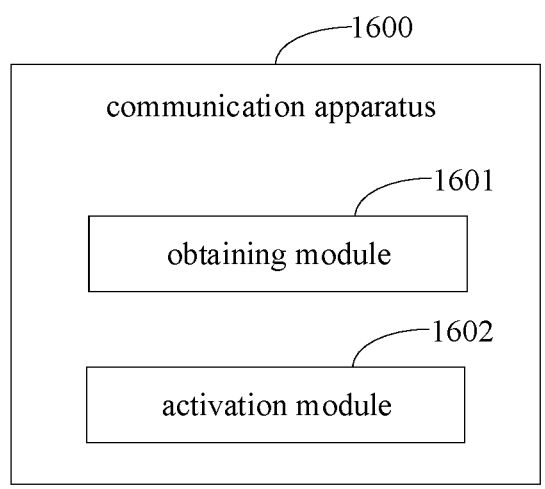
FIG. 16 is a structural diagram of a communication apparatus according to another embodiment of the present disclosure.

FIG. 16 is a structural diagram of a communication apparatus according to another embodiment of the present disclosure. As shown in FIG. 16, the device 1600 may include an obtaining module 1601 and an activation module 1602.

The obtaining module 1601 is configured to obtain a second UP security activation indication sent by a relay UE, in which the second UP security activation indication indicates whether to activate UP security of a remote UE.

The activation module 1602 is configured to in response to the second UP security activation indication indicating to activate the UP security, activate the UP security of the remote UE based on the second UP security activation indication.

To sum up, in the communication apparatus according to the embodiment of the present disclosure, the remote UE may obtain the second UP security activation indication sent by the relay UE, in which the second UP security activation indication indicates whether to activate the UP security of the remote UE, and when the second UP security activation indication indicates to activate the UP security, the remote UE activates the UP security of the remote UE based on the second UP security activation indication. That is to say, the apparatus of the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

In an embodiment of the present disclosure, the second link includes a PC5 link.

Further, in another embodiment of the present disclosure, the above apparatus is also configured to establish a signaling security of the second link.

Further, in another embodiment of the present disclosure, the above apparatus is also configured to: send a Direct Communication Request message to a relay UE; obtain a Direct Security Mode Command message sent by the relay UE, in which the Direct Security Mode Command message is protected by the session key and the Direct Security Mode Command message includes intermediate key related parameters: 5G_K$_{NRP}$ Freshness Parameter; 5GPRUK_Info; determine a session key based on the intermediate key related parameters; send a Direct Security Mode Complete message to the relay UE, in which the Direct Security Mode Complete message is protected by the session key.

Further, in another embodiment of the present disclosure, the above obtaining module 1601 is also configured to: obtain a second UP security activation indication sent by the relay UE via a Direct Communication Accept message.

Further, in another embodiment of the present disclosure, the above apparatus is also configured to: communicate with the relay UE based on a UP security policy of the second link.

Further, in another embodiment of the present disclosure, the UP security policy includes at least one of: a policy of UP integrity protection; or a policy of UP encryption protection.

Further, in another embodiment of the present disclosure, the second UP security activation indication indicates at least one of: whether to activate the UP integrity protection; or whether to activate the UP encryption protection.

Figure 17:
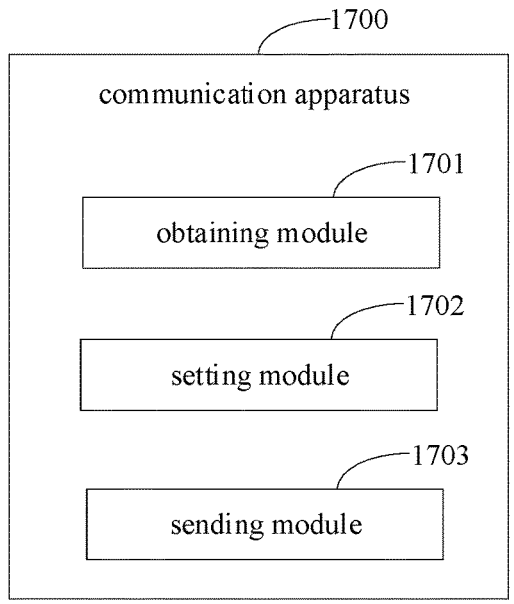
FIG. 17 is a structural diagram of a communication apparatus according to yet another embodiment of the present disclosure.

FIG. 17 is a structural diagram of a communication apparatus according to another embodiment of the present disclosure. As shown in FIG. 17, the apparatus 1700 may include: an obtaining module 1701, a setting module 1702 and a sending module 1703.

The obtaining module 1701 is configured to obtain a PDU session establishment request sent by a relay UE via the base station.

The setting module 1702 is configured to set a UP security policy.

The sending module 1703 is configured to send a PDU session request message to the base station, in which the PDU session request message includes the UP security policy.

To sum up, in the communication apparatus according to the embodiment of the present disclosure, the core network device may obtain the PDU session establishment request sent by the relay UE via the base station, set the UP security policy, and send the N2 PDU session request message to the base station, in which the N2 PDU session request message includes session management information which contains the UP security policy. That is to say, the apparatus of the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

In an embodiment of the present disclosure, the above apparatus is also configured to: obtain a Relay Key Request message sent by the relay UE, in which the Relay Key Request message includes a Relay Service Code; send an authorization message to the relay UE based on the Relay Service Code; send to the relay UE an intermediate key parameter and intermediate key related parameters used to determine a session key, in which the intermediate key parameter includes $5G\_K_{NRP}$, and the intermediate key related parameters include $5G\_K_{NRP}$ Freshness Parameter and 5GPRUK_Info.

Further, in another embodiment of the present disclosure, the above apparatus is also configured to: determine a 5GPRUK, and determine a 5GPRUK ID and the 5GPRUK_Info corresponding to the 5GPRUK; determine the $5G\_K_{NRP}$ Freshness Parameter and generate the $5G\_K_{NRP}$ based on the 5GPRUK, the $5G\_K_{NRP}$ Freshness Parameter, Nonce_1, and the Relay Service Code; and send to the relay UE, the intermediate key parameter and the intermediate key related parameters.

Figure 18:
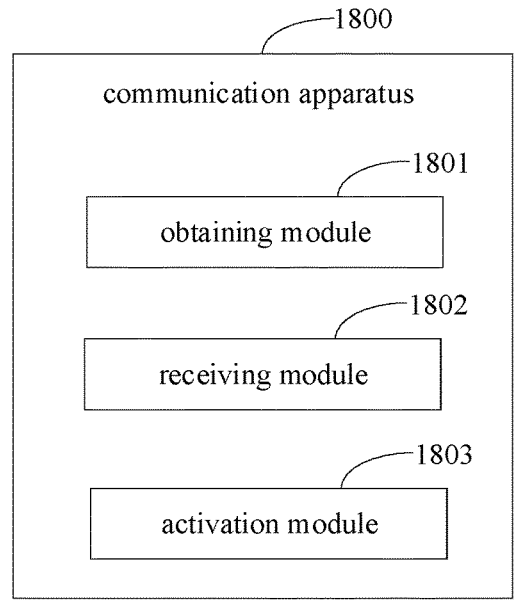
FIG. 18 is a structural diagram of a communication apparatus according to yet another embodiment of the present disclosure.

FIG. 18 is a structural diagram of a communication apparatus according to another embodiment of the present disclosure. As shown in FIG. 18, the apparatus 1800 may include: an obtaining module 1801, a receiving module 1802 and an activation module 1803.

The obtaining module 1801 is configured to obtain a PDU session establishment request sent by a relay UE, and send the PDU session establishment request to a core network device.

The receiving module 1802 is configured to receive a PDU session request message sent by the core network device, in which the PDU session request message includes the UP security policy.

The activation module 1803 is configured to activate UP security of a first link between the relay UE and the base station based on the UP security policy sent by the core network device.

To sum up, in the communication apparatus according to the embodiment of the present disclosure, the base station may obtain the PDU session establishment request sent by the relay UE, and send the PDU session establishment request to the core network device; then the base station may receive the N2 PDU session request message sent by the core network device, in which the N2 PDU session request message includes session management information which contains the UP security policy, and activates the UP security of the first link between the relay UE and the base station based on the UP security policy sent by the core network device. That is to say, the apparatus of the embodiment of the present disclosure may determine the UP security policy of the second link between the relay UE and the remote UE based on the UP security policy of the first link between the relay UE and the base station. This ensures the security policy of the first link is consistently enforced with the security policy of the second link, while both the first link and the second link are protected. As such, end-to-end security of communication between the remote UE and the base station is ensured and the communication security is improved.

In an embodiment of the present disclosure, the first link includes a Uu link.

Further, in another embodiment of the present disclosure, the activation module 1803 is also configured to: activate UP security of the base station based on the UP security policy; and send a first UP security activation indication to the relay UE based on the UP security policy, in which the first UP security activation indication indicates whether to activate UP security of a first interface in the relay UE corresponding to the first link.

Further, in another embodiment of the present disclosure, the first interface includes a Uu interface.

Further, in another embodiment of the present disclosure, the above apparatus is also configured to: communicate with the relay UE based on a UP security policy of the first link.

Further, in another embodiment of the present disclosure, the UP security policy includes at least one of: a policy of UP integrity protection; or a policy of UP encryption protection.

Further, in another embodiment of the present disclosure, the first UP security activation indication indicates at least one of: whether to activate the UP integrity protection; or whether to activate the UP encryption protection.

An executable program is stored in a computer storage medium according to the embodiment of the present disclosure. When the executable program is executed by a processor, any of the methods as shown in FIG. 1 to FIG. 5, or FIG. 6 to FIG. 8, or FIG. 9 to FIG. 10, or FIG. 11 to FIG. 14 may be implemented.

In order to implement the above embodiments, the present disclosure also proposes a computer program product, including a computer program. When the computer program is executed by a processor, any of the methods as shown in FIG. 1 to FIG. 5, or FIG. 6 to FIG. 8, or FIG. 9 to FIG. 10, or FIG. 11 to FIG. 14 may be implemented.

In addition, in order to implement the above embodiments, the present disclosure also proposes a computer program. When the program is executed by a processor, any of the methods as shown in FIG. 1 to FIG. 5, or FIG. 6 to FIG. 8, or FIG. 9 to FIG. 10, or FIG. 11 to FIG. 14 may be implemented.

In order to implement the above embodiments, the present disclosure also provides a core network device, including: a transceiver; a memory; and a processor respectively connected to the transceiver and the memory. The processor is configured to control transmission and reception of a wireless signal, implement the method described in FIG. 9 to FIG. 10, by executing computer-executable instructions on the memory.

Figure 19:
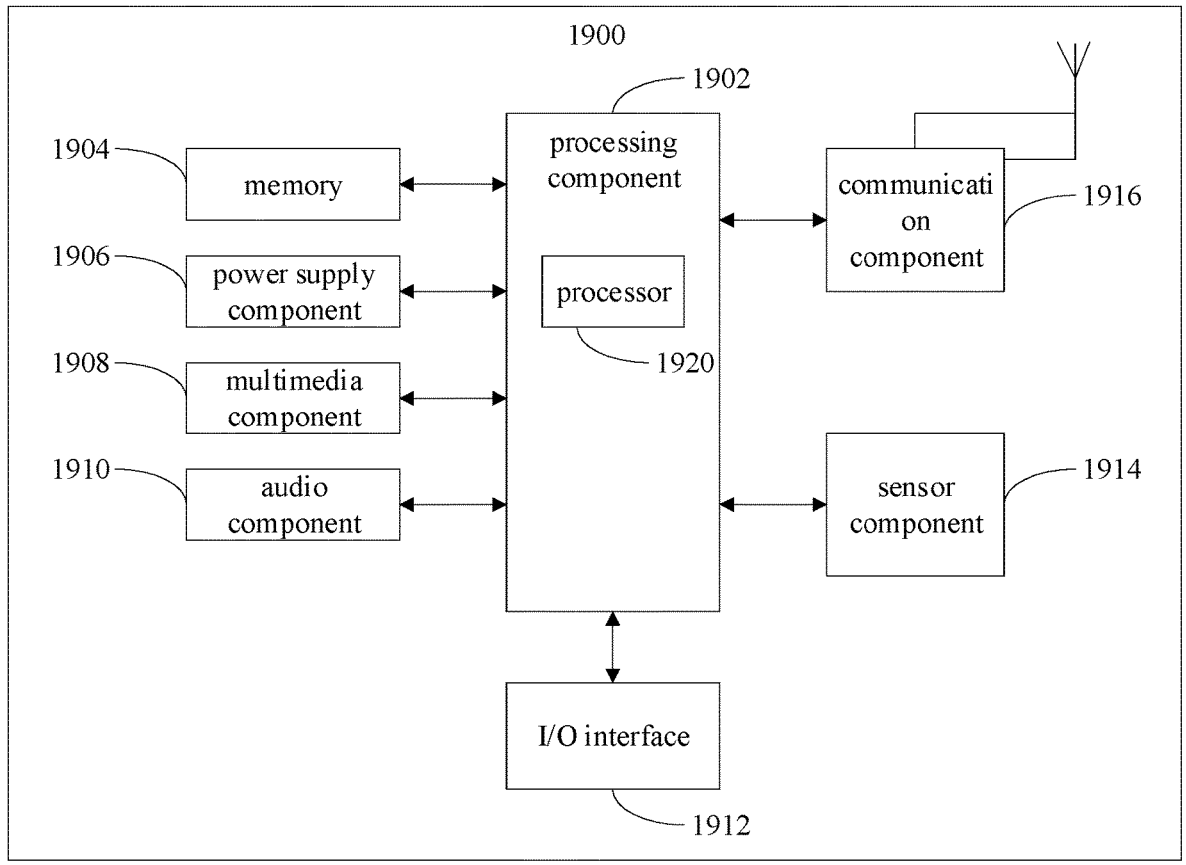
FIG. 19 is a block diagram of a user equipment according to an embodiment of the present disclosure.

FIG. 19 is a block diagram of a UE 1900 according to an embodiment of the present disclosure. For example, the UE 1900 may be a mobile phone, a computer, a digital broadcast terminal device, a messaging device, a game console, a tablet device, a medical device, a fitness device, a personal digital assistant, etc.

Referring to FIG. 19, the UE 1900 may include at least one of: a processing component 1902, a memory 1904, a power supply component 1906, a multimedia component 1908, an audio component 1910, an input/output (I/O) interface 1912, a sensor component 1913, and a communication component 1916.

The processing component 1902 generally controls overall operations of the UE 1900, such as operations associated with display, phone calls, data communications, a camera operation and a recording operation. The processing component 1902 may include at least one processor 1920 to execute instructions to complete all or part of the steps of the above method. Additionally, the processing component 1902 may include at least one module that facilitates interactions between the processing component 1902 and other components. For example, the processing component 1902 may include a multimedia module to facilitate interactions between the multimedia component 1908 and the processing component 1902.

The memory 1904 is configured to store various types of data to support the operations at the UE 1900. Examples of the data include instructions for any application or method operating on the UE 1900, contact data, phonebook data, messages, pictures, videos, etc. The memory 1904 may be implemented by any type of volatile or non-volatile storage device, or their combination, such as a static random access memory (SRAM), an electrically erasable programmable read-only memory (EEPROM), an erasable programmable read-only (EPROM), a programmable read-only memory (PROM), a read-only memory (ROM), a magnetic memory, a flash memory, a magnetic disk or an optical disk.

The power supply component 1906 provides power to various components of the UE 1900. The power supply component 1906 may include a power management system, at least one power supply, and other components associated with generating, managing, and distributing powers to the UE 1900.

The multimedia component 1908 includes a screen that provides an output interface between the UE 1900 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, slides, and gestures on the touch panel. The touch sensor may not only sense a boundary of a touch or sliding action, but also detect a wake-up time and a pressure related to the touch or sliding action. In some embodiments, the multimedia component 1908 includes a front-facing camera and/or a rear-facing camera. When the UE 1900 is in an operating mode, such as a shooting mode or a video mode, the front camera and/or rear camera may receive external multimedia data. Each of the front-facing camera and the rear-facing camera may be a fixed optical lens system or have a focal length and optical zoom capabilities.

The audio component 1910 is configured to output and/or input audio signals. For example, the audio component 1910 includes a microphone (MIC) configured to receive external audio signals when the UE 1900 is in an operating mode, such as a call mode, a record mode, and a speech recognition mode. The received audio signals may be further stored in the memory 1904 or sent via the communication component 1916. In some embodiments, the audio component 1910 also includes a speaker for outputting audio signals.

The I/O interface 1912 provides an interface between the processing component 1902 and a peripheral interface module. The peripheral interface module may be a keyboard, a click wheel, a button, etc. These buttons may include, but are not limited to: a home button, a volume button, a start button and a lock button.

The sensor component 1913 includes at least one sensor for providing various aspects of status assessment for the UE 1900. For example, the sensor component 1913 may detect an open/closed state of the UE 1900, a relative positioning of a component, such as a display and a keypad of the UE 1900, a position change of the UE 1900 or a component of the UE 1900, a presence or absence of contact between the user and the UE 1900, an orientation or acceleration/deceleration of the UE 1900, and a temperature change of the UE 1900. The sensor component 1913 may include a proximity sensor configured to detect a presence of nearby objects without any physical contact. The sensor component 1913 may also include a light sensor, such as a CMOS or CCD image sensor, for use in imaging applications. In some embodiments, the sensor component 1913 may also include an acceleration sensor, a gyroscope sensor, a magnetic sensor, a pressure sensor, or a temperature sensor.

The communication component 1916 is configured to facilitate wired or wireless communication between the UE 1900 and other devices. The UE 1900 may access wireless networks based on a communication standard, such as WiFi, 2G or 3G, or their combination. In an embodiment, the communication component 1916 receives broadcast signals or broadcast related information from an external broadcast management system via a broadcast channel. In an embodiment, the communication component 1916 also includes a near field communications (NFC) module to facilitate short-range communication. For example, the NFC module may be implemented based on a radio frequency identification (RFID) technology, an infrared data association (IRDA) technology, an ultra-wideband (UWB) technology, bluetooth (BT) technology and other technologies.

In an embodiment, the UE 1900 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronic components for executing the above method.

Figure 20:
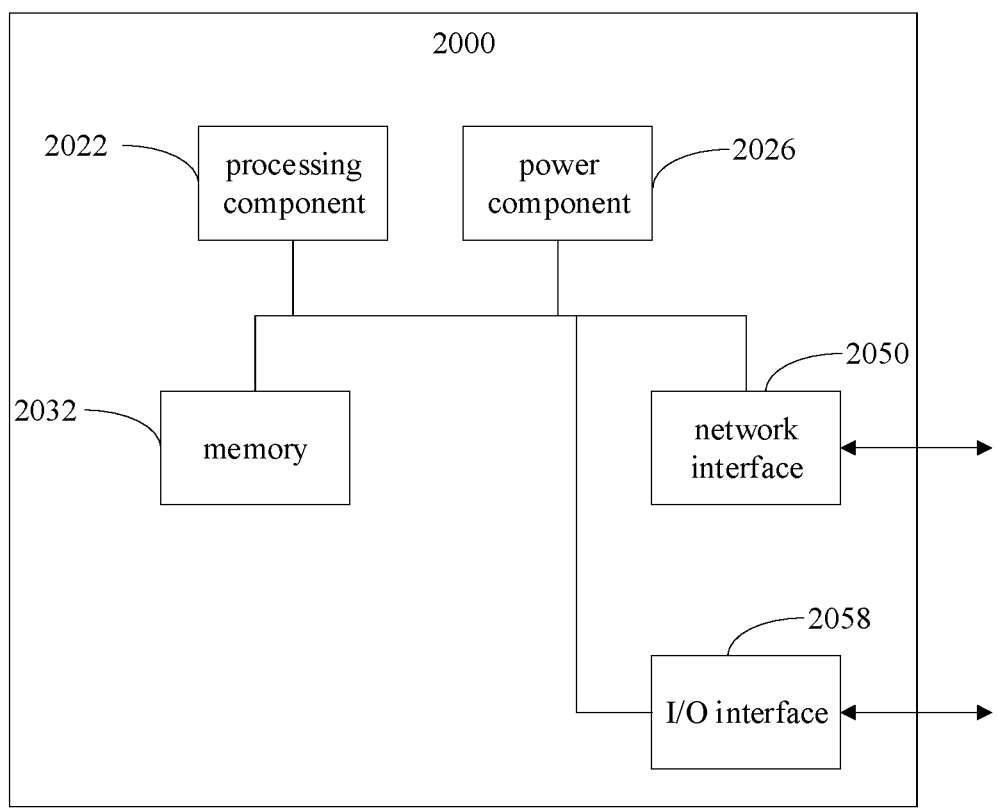
FIG. 20 is a block diagram of a base station according to an embodiment of the present disclosure.

FIG. 20 is a block diagram of a base station 2000 according to an embodiment of the present disclosure. For example, the base station 2000 may be provided as a base station. Referring to FIG. 20, the base station 2000 includes a processing component 2011, which further includes at least one processor, and memory resources represented by a memory 2032 for storing instructions, such as application programs, executable by the processing component 2022. The application programs stored in the memory 2032 may include one or more modules, each corresponding to a set of instructions. In addition, the processing component 2015 is configured to execute instructions to perform any of the foregoing methods applied to the base station, for example, the method shown in FIG. 1.

The base station 2000 may also include a power supply component 2026 configured to perform power management of the base station 2000, a wired or wireless network interface 2050 configured to connect the base station 2000 to a network, and an input/output (I/O) interface 2058. The base station 2000 may operate based on an operating system stored in the memory 2032, such as Windows Server™, Mac OS X™, Unix™, Linux™, Free BSD™ or the like.

Other embodiments of the invention will be readily apparent to those skilled in the art from consideration of the specification and practice of the invention disclosed herein. The present disclosure is intended to cover any variations, usages, or adaptations of the invention that follow the general principles of the invention and include common knowledge or conventional technical means in the technical field that are not disclosed in the present disclosure. The description and the embodiments are to be regarded as exemplary only, and the true scope of the present disclosure are given by the appended claims.

It should be understood that the present disclosure is not limited to the precise structure described above and shown in the drawings, and various modifications and changes may be made without departing from its scope. The scope of the present disclosure is only limited by the appended claims.

What is claimed is:

1. A communication method, performed by a relay user equipment (UE), comprising:
    determining an activation status of a user plane (UP) security policy of a first link between the relay UE and a base station;
    activating UP security of a second link between the relay UE and a remote UE based on the activation status of the UP security policy of the first link; and
    establishing a signaling security of the second link;
    wherein establishing the signaling security of the second link comprises:
    obtaining a Direct Communication Request message sent by the remote UE;
    sending a Relay Key Request message to a core network device based on the Direct Communication Request message, wherein the Relay Key Request message comprises a Relay Service Code;
    receiving an authorization message sent by the core network device based on the Relay Service Code;
    obtaining an intermediate key parameter and intermediate key related parameters sent by the core network device, wherein the intermediate key parameter comprises a 5G $K_{NRP}$, and the intermediate key related parameters comprise a 5G $K_{NRP}$ Freshness Parameter and a 5GPRUK Info, the 5G $K_{NRP}$ is generated based on 5GPRUK, the 5G $K_{NRP}$ Freshness Parameter, Nonce 1, and the Relay Service Code;
    determining a session key based on the intermediate key parameter, wherein the session key is configured to protect the signaling security of the second link;
    sending a Direct Security Mode Command message to the remote UE, wherein the Direct Security Mode Command message is protected by the session key, and the Direct Security Mode Command message comprises the intermediate key related parameters; and
    receiving a Direct Security Mode Complete message sent by the remote UE, wherein the Direct Security Mode Complete message is protected by the session key.

2. The method of claim 1, wherein the first link comprises a Uu link; and the second link comprises a PC5 link.

3. The method of claim 1, wherein determining the activation status of the UP security policy of the first link between the relay UE and the base station comprises:
    determining whether there is a need to establish a new packet data unit (PDU) session between the relay UE and the base station;
    in response to determining that there is no need to establish a new PDU session, determining an activation status of a UP security policy of a first interface in the relay UE corresponding to the first link as the activation status of the UP security policy of the first link;
    in response to determining that there is a need to establish a new PDU session, sending a PDU session establishment request to a core network device via the base station; obtaining a first UP security activation indication sent by the base station, wherein the first UP security activation indication indicates whether to activate UP security of a first interface in the relay UE corresponding to the first link; activating the UP security of the first interface based on the first UP security activation indication, and determining an activation status of a UP security policy of the first interface as the activation status of the UP security policy of the first link.

4. The method of claim 3, wherein the first interface comprises a Uu interface.

5. The method of claim 3, wherein activating the UP security of the second link between the relay UE and the remote UE based on the activation status of the UP security policy of the first link comprises:
    mapping the UP security policy of the first interface to a second interface in the relay UE corresponding to the second link;
    determining a second UP security activation indication based on an activation status of a security policy of the second interface, wherein the second UP security activation indication indicates whether to activate UP security of the remote UE; and
    sending the second UP security activation indication to the remote UE via a Direct Communication Accept message.

6. The method of claim 5, wherein the second interface includes a PC5-U interface;
    wherein the UP security policy comprises at least one of: a policy of UP integrity protection; or a policy of UP encryption protection;
    wherein the method further comprises: communicating with the base station based on the UP security policy of the first link; and communicating with the remote UE based on a UP security policy of the second link.

7. The method of claim 6, wherein the first UP security activation indication indicates at least one of:
    whether to activate the UP integrity protection; or
    whether to activate the UP encryption protection;
    the second UP security activation indication indicates at least one of: whether to activate the UP integrity protection; or whether to activate the UP encryption protection.

8. A communication method, performed by a remote user equipment (UE), comprising:
    obtaining a second user plane (UP) security activation indication sent by a relay UE, wherein the second UP security activation indication indicates whether to activate UP security of the remote UE;

in response to the second UP security activation indication indicating to activate the UP security, activating the UP security of the remote UE based on the second UP security activation indication; and establishing a signaling security of the second link;

wherein establishing the signaling security of the second link comprises:

sending a Direct Communication Request message to the relay UE;

obtaining a Direct Security Mode Command message sent by the relay UE, wherein the Direct Security Mode Command message is protected by a session key, the Direct Security Mode Command message comprises intermediate key related parameters that are a 5G $K_{NRP}$ Freshness Parameter and a 5GPRUK Info;

determining the session key based on the intermediate key related parameters; and sending a Direct Security Mode Complete message to the relay UE, wherein the Direct Security Mode Complete message is protected by the session key.

9. The method of claim 8, wherein a second link between the relay UE and the remote UE comprises a PC5 link.

10. The method of claim 8, wherein obtaining the second UP security activation indication sent by the relay UE comprises:

obtaining the second UP security activation indication sent by the relay UE via a Direct Communication Accept message.

11. The method of claim 10, further comprising:

communicating with the relay UE based on a UP security policy of the second link;

wherein the UP security policy comprises at least one of: a policy of UP integrity protection; or a policy of UP encryption protection;

wherein the second UP security activation indication indicates at least one of: whether to activate the UP integrity protection; or whether to activate the UP encryption protection.

12. A communication method, performed by a base station, comprising:

obtaining a packet data unit (PDU) session establishment request sent by a relay user equipment (UE), and sending the PDU session establishment request to a core network device;

receiving a PDU session request message sent by the core network device, wherein the PDU session request message comprises a user plane (UP) security policy; and activating UP security of a first link between the relay UE and the base station based on the UP security policy sent by the core network device;

wherein UP security of a second link between the relay UE and a remote UE is activated based on an activation status of the UP security policy; a signaling security of the second link is established by the relay UE to perform:

obtaining a Direct Communication Request message sent by the remote UE;

sending a Relay Key Request message to a core network device based on the Direct Communication Request message, wherein the Relay Key Request message comprises a Relay Service Code;

receiving an authorization message sent by the core network device based on the Relay Service Code;

obtaining an intermediate key parameter and intermediate key related parameters sent by the core network device, wherein the intermediate key parameter comprises a 5G $K_{NRP}$, and the intermediate key related parameters comprise a 5G $K_{NRP}$ Freshness Parameter and a 5GPRUK Info, the 5G $K_{NRP}$ is generated based on 5GPRUK, the 5G $K_{NRP}$ Freshness Parameter, Nonce 1, and the Relay Service Code;

determining a session key based on the intermediate key parameter, wherein the session key is configured to protect the signaling security of the second link;

sending a Direct Security Mode Command message to the remote UE, wherein the Direct Security Mode Command message is protected by the session key, and the Direct Security Mode Command message comprises the intermediate key related parameters; and receiving a Direct Security Mode Complete message sent by the remote UE, wherein the Direct Security Mode Complete message is protected by the session key.

13. The method of claim 12, wherein the first link comprises a Uu link.

14. The method of claim 13, wherein activating the UP security of the first link between the relay UE and the base station based on the UP security policy sent by the core network device comprises:

activating UP security of the base station based on the UP security policy; and sending a first UP security activation indication to the relay UE based on the UP security policy, wherein the first UP security activation indication indicates whether to activate UP security of a first interface in the relay UE corresponding to the first link;

wherein the UP security policy comprises at least one of: a policy of UP integrity protection; or a policy of UP encryption protection; the first UP security activation indication indicates at least one of: whether to activate the UP integrity protection; or whether to activate the UP encryption protection.

15. The method of claim 14, wherein the first interface comprises a Uu interface.

16. The method of claim 12, further comprising:

communicating with the relay UE based on a UP security policy of the first link.

* * * * *